United States Patent
Nann et al.

(10) Patent No.: US 8,282,045 B2
(45) Date of Patent: Oct. 9, 2012

(54) CRAFT AND METHOD OF COUPLING A PROPULSION SYSTEM TO A REGENERATIVE FUEL CELL SYSTEM

(75) Inventors: Isabelle Nann, Cannes la Bocca (FR); Antoine Iffly, Bagnols en Forêt (FR); Martin Lang, Sassenheim (NL)

(73) Assignee: Thales, Neuilly sur Seine (FR)

( * ) Notice: Subject to any disclaimer, the term of this patent is extended or adjusted under 35 U.S.C. 154(b) by 215 days.

(21) Appl. No.: 12/711,955

(22) Filed: Feb. 24, 2010

(65) Prior Publication Data
US 2010/0213319 A1 Aug. 26, 2010

(30) Foreign Application Priority Data
Feb. 24, 2009 (FR) ...................................... 09 00836

(51) Int. Cl.
*B64G 1/00* (2006.01)
*B64G 1/40* (2006.01)
(52) U.S. Cl. ................................. 244/172.3; 244/172.2
(58) Field of Classification Search ............... 244/172.3, 244/172.2, 158.1, 58
See application file for complete search history.

(56) References Cited

U.S. PATENT DOCUMENTS

| 5,880,356 A * | 3/1999 | Delepierre-Massue et al. ........................ 244/172.2 |
| 6,374,618 B1 | 4/2002 | Lak |

* cited by examiner

*Primary Examiner* — Tien Dinh
*Assistant Examiner* — Richard R Green
(74) *Attorney, Agent, or Firm* — LaRiviere, Grubman & Payne, LLP

(57) ABSTRACT

The invention relates to a craft comprising an energy storage system of the RFCS (regenerative fuel cell system) type and a system for pressurizing the propellants used for propulsion. The craft also comprises a plurality of means (31 to 38) for coupling the tanks of the fuel cell to the propellant-pressurizing tanks of the propulsion system of the craft when the tanks of the propellant-pressurizing system are no longer used.

The invention also relates to the method of coupling the tanks of the propellant-pressurizing means to the energy storage system.

The invention applies particularly to telecommunication satellites and more generally to spacecraft.

10 Claims, 4 Drawing Sheets

CRAFT AND METHOD OF COUPLING A PROPULSION SYSTEM TO A REGENERATIVE FUEL CELL SYSTEM

PRIORITY CLAIM

This application claims priority to French Patent Application Number 09 00836, Craft and Method of Coupling a Propulsion System to a Regenerative Fuel Cell System, filed on Feb. 24, 2009.

FIELD OF THE INVENTION

The field of the invention relates to craft comprising an energy storage system of the regenerative fuel cell type and a propulsion system, and more particularly to satellite-type spacecraft.

BACKGROUND OF THE INVENTION

At the present time, on board satellites there are numerous electronic systems for example for fulfilling observation missions or missions dedicated to terrestrial communication networks. They include notably a module for communication with the ground, a module for controlling and guiding the satellite, an optoelectronic module for observation missions and/or a module for fulfilling communication infrastructure functions. To operate all the electronic systems, current satellites have an energy storage system of the battery type. They also have a solar energy generator which enables the electronic systems of the satellite to be powered when it is exposed to sunlight and which also enables the batteries to be recharged. When the satellite is located in a position in which the sun is eclipsed by the Earth, the electronic systems are powered solely by the batteries.

The progress made in the field of fuel cells has made it possible to envisage installing such energy storage systems on board satellites. Regenerative fuel cell systems (RFCSs) provide an effective self-contained solution for power delivery and are particularly suitable for classes of telecommunication satellites requiring high power for nominal operation. In the prior art, spacecraft comprising an energy storage system of the fuel cell type are known. For example, the document entitled *"PEM Fuel Cell Status and Remaining Challenges for Manned Space-Flight Applications"* describes such systems. This document describes inhabited spacecraft and are less constrained by space and miniaturization problems than what we find in satellite design.

It is also known to use fuel cells in the automobile field. However, the space field, in comparison with the automobile field, imposes particular operating constraints on the electronic systems and notably for the functions of supplying energy to the systems. For example, mention may be made of the severe operating environment of the electronic systems, notably in terms of temperature, the reliability constraints of the electronic systems, which have to have an extremely low failure rate and constantly have to undergo changes in power supply mode, depending on whether the satellite is in a position in which the sun is eclipsed and, of course, the constraint that the satellite be energy self-sufficient, which constraint must be solved in order for it to fulfil missions of long duration in space.

In order for the problems dictated by space field, more particularly in respect of satellites, to be better understood, we will now briefly describe the operating modes of a telecommunication satellite. After a satellite has been launched, it is placed in a geostationary orbit after a transfer phase during which it performs a succession of elliptical trajectories until reaching the operational trajectory. A distinction is therefore made between a first, launch phase, a second, transfer phase and a third, geostationary orbit phase. During the launch phase and before the deployment of the solar generators during the transfer phase, the operational systems of the satellite are powered by the on-board energy storage system, which system may be of the battery type or of the regenerative fuel cell type. In the case of a regenerative fuel cell or a battery, the system must have a sufficient energy storage level before the launch in order to provide the necessary power for the electronic systems during the launch phase and before the solar generators are deployed. During the transfer phase and the orbit phase, the satellite is capable of recovering energy by means of a solar power generation system when the latter is correctly directed towards the sun. The electronic systems are therefore powered by the latter system when the satellite is exposed to the sun and by the regenerative fuel cell or the battery in the eclipse positions. The function of the power generation system is also to recharge the secondary energy source (battery or regenerative fuel cell in electrolyser mode).

The principle of the fuel cell is such that the solar power is used to carry out the electrolysis and form, from a product, the fuel and the oxidizer, the latter two elements being stored in separate tanks; and the electrochemical reaction between these two elements generates energy by means of a fuel cell. In fact, a fuel cell is not an energy storage means but an energy conversion means, and in this particular case a means of converting solar energy to electrochemical energy.

Consequently, fuel cell systems require the use of tanks for storing the fuel, the oxidizer and the product resulting from the fuel cell reaction. For example, in the case of the most commonly used fuel cell solution of the $H_2/O_2$ type, the reactants are maintained in a gaseous state. This means that auxiliary tanks have to be installed. Depending on the storage pressure and the satellite power, the tanks may become very bulky. This constraint consequently increases the overall size and the mass of the satellite for a system in which the complex electronics are already highly constrained. The electrical performance of energy storage systems is measured in Wh/kg, and consequently the increase in mass results in a reduction in satellite performance.

SUMMARY OF THE INVENTION

One objective of the invention is to improve the electrical performance of telecommunication satellites for the purpose of providing a viable solution for adopting an energy storage system of the fuel cell type in such spacecraft.

More precisely, the invention is a craft comprising an energy storage system of the regenerative fuel cell type, a chemical propulsion system and a system for pressurizing the propellants used for propulsion, the energy storage system comprising at least three tanks making it possible to contain, in a first tank, a fuel, in a second tank, the oxidizer and, in a third tank, the product resulting from the reaction between the oxidizer and the fuel and the pressurizing system comprising at least pressurizing fourth and fifth tanks containing a pressurizing gas.

Advantageously, the craft also comprises a plurality of means for coupling the tanks of the energy storage system to the tanks of the propellant pressurizing system, these means comprising means for draining the pressurizing tanks, means for isolating the propulsion system from the pressurizing tanks, means for isolating the pressurizing tanks from each other, and means for connecting, when the pressurizing tanks no longer contain the pressurizing gas, the fuel tank to the fourth tank and the oxidizer tank to the fifth tank. In fact, once the pressurizing tanks have become unnecessary, said tanks can be used to store fuel and oxidizer.

Advantageously, the dimensions of the tanks of the energy storage system containing the oxidizer and the fuel are smaller than the dimensions necessary for the power requirements of the craft during the mission phase at a given pressure, it being possible for the pressurizing tanks also to serve in the energy storage system during the mission phase. The tanks have one dimension smaller than that necessary. This is because the pressurizing system does not include a compressor for storing the fuel and the oxidizer in their respective tanks at this given pressure, the volume of the tanks not being sufficient to serve themselves for necessary fuel and oxidizer storage during the mission phase. The mission phase corresponds to the phase during which all the electronic systems on board the craft are in operation and consume power. Before the operational phase, the satellite systems consume less power. Advantageously, the craft comprises a system of valves between the propulsion system and the energy storage system, first valves between the pressurizing tanks and the propulsion system, second valves between the first tank and the fourth tank, third valves between the second tank and the fifth tank, and fourth valves for draining the pressurizing tanks.

Advantageously, the means for draining the pressurizing tanks include, at their outlets, a means for ejecting fluids to the outside of the craft with no propulsion effect.

Advantageously, the energy storage system is powered by a system for generating power for carrying out the electrolysis.

Advantageously, the invention applies to satellite-type spacecraft according to any one of the abovementioned embodiments.

The subject of the invention is also a method for coupling the tanks of an energy storage system of the regenerative fuel cell type to tanks for pressurizing the propellants of a principal propulsion system of a craft according to any of the abovementioned embodiments. Advantageously, the method carries out the following successive steps:

in a first step, the fuel is contained only in the first tank and the oxidizer is contained only in the second tank;

in a second step, the propulsion system is isolated from the pressurizing tanks;

in a third step, the pressurizing tanks are drained;

in a fourth step, the pressurizing tanks are isolated from each other;

in a fifth step, the pressurizing tanks are connected to the first and second tanks of the energy storage system; and in a sixth step, the fourth tank contains a portion of the fuel and the fifth tank contains a portion of the oxidizer, the other portions being contained in the first and second tanks of the energy storage system.

Advantageously, in the first step, the dimensions of the tanks containing the oxidizer and the fuel are smaller than the dimensions necessary for the power requirements of the craft in the mission phase at a given pressure. In the mission phase of a telecommunication satellite, i.e. during the geostationary phase, the power requirements are highest. Before becoming operational, the power requirements are less and permit the use of smaller oxidizer and fuel tanks. The invention makes it possible to use propellant-pressurizing tanks to contain the additional fuel and oxidizer, relative to the transfer phase, and necessary for carrying out the satellite's mission, the pressurizing tanks then being unnecessary during this phase.

The method according to the invention applies particularly to spacecraft intended to be positioned in geostationary orbit. The orbit positioning phase is preceded by a craft launch phase followed by a transfer phase until the satellite is positioned in a geostationary orbit, and advantageously the second step of the method is triggered after the craft transfer phase.

By implementing the invention on a craft it is possible to reduce the mass of the craft thanks to the coupling of the various tanks, enabling the size of the fuel and oxidizer tanks of the regenerative fuel cell to be reduced, which tanks would in fact be much bulkier without this coupling. Such coupling is particularly advantageous in the case of spacecraft since these must be propelled in space and must be optimally designed in terms of mass. The mass saving also has an impact on the performance of the energy storage system, which is measured in Wh/kg. The satellite tanks are designed so as to be able to deliver sufficient energy to the electronic systems in order to provide for their requirements during the launch phase and before the solar generators are deployed.

One advantage of the invention is that the volume of the reactants on board can be increased with a small mass impact and advantageously for power levels of around 15 kW to 25 kW. This situation makes it possible to meet greater peak demands by the useful loads than the battery systems are currently capable of doing, and thus enables the solar generators to be downsized.

The invention also makes it possible to optimise the regenerative fuel cell energy storage systems on board satellites and consequently enables these systems, which are still in an immature state, to be more rapidly adopted. This is because such systems are attractive in the case of satellites having a nominal operating power greater than 15 kW. They offer more effective energy delivery and peak consumption response characteristics than the currently used battery systems.

BRIEF DESCRIPTION OF THE DRAWINGS

The invention will be better understood and other advantages will become apparent on reading the following description given by way of non-limiting example and thanks to the appended figures in which:

FIG. 1 shows a simplified diagram of two functional systems of a satellite, namely an RFCS first system, for storing energy, and a chemical propulsion second system.

DETAILED DESCRIPTION OF PREFERRED EMBODIMENT

The function of the RFCS system 20 is to deliver the necessary energy to the electronic systems when the satellite is no longer exposed to sunlight. To do this, the RFCS system comprises a fuel cell connected to three fluid tanks. As a non-limiting example, the fuel cell is of the $H_2/O_2$ PEM (proton exchange membrane) type. A first tank 1 contains a hydrogen-based fuel in a gaseous state. A second tank 2 contains the associative oxygen-based oxidizer, again in a gaseous form, and the third tank 3 contains the product resulting from the reaction in the fuel cell, this product being water in this particular case of a fuel cell. The invention is not limited to this type of regenerative fuel cell and can be applied for any other type, the specific developments in each type of cell not limiting the scope of the invention. In a first embodiment, the tanks of the regenerative fuel cell system may be separate and dedicated. The electrolyser is designed with respect to the necessary power in eclipse mode. The electrolysis of the water resulting from one or more power peaks demanded by the useful load takes place outside the nominal charging periods.

Figure 1:
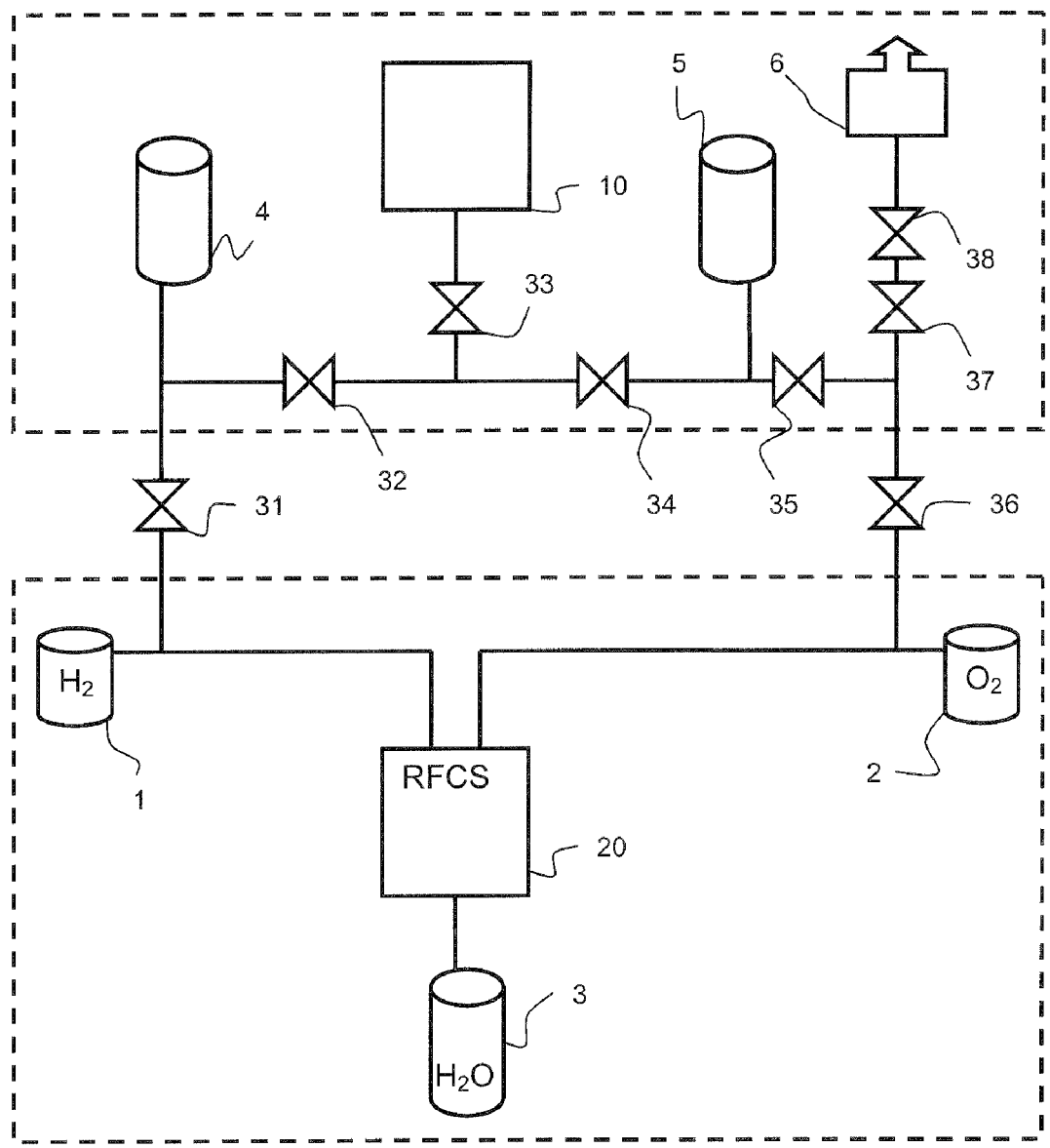
FIG. 1 shows a diagram of the coupling between the energy storage system of the fuel cell and the chemical propulsion system of a satellite, the other functional systems of the satellite not being shown.

The power generation system and the electronic systems of the satellite have not been shown in the diagram in FIG. 1. This is because the invention is not limited to one category of satellite, nor also to one category of craft. The invention applies to any craft that may require unexploited reserves at a given moment during its operation.

The chemical propulsion system principally comprises propulsion means 10 and tanks 4 and 5 for pressurizing the principal propellants for the principal propulsion means. There may be 2 or more pressurizing tanks in a satellite. The propulsion system is used during the transfer phase for placing the satellite in operation in a geostationary orbit once the satellite has separated from its launcher. Once the satellite is positioned in the geostationary orbit, the pressurizing tanks are no longer in service and may be emptied, either by using all the gas or by carrying out a tank draining action. To do this, the satellite includes a draining device 6 for discharging the pressurizing gas from the tanks 4 and 5 of the satellite. Preferably, this device is a non-propulsive fluid discharge device so as to limit any disturbance on the satellite.

The elements contained in the tanks 4 and 5 of the propulsion system are different from the reactants contained in the tanks 1 and 2 of the regenerative fuel cell system. In a satellite mode of application, the fluids coming from the propulsion system and the fluids coming from the regenerative fuel cell system must not be mixed.

The invention consists in coupling the tanks of the regenerative fuel cell system to the pressurizing tanks of the craft propulsion system so as to benefit from the gas tank storage volume for storing the reactants that are produced during the electrolysis of the regenerative fuel cell system. To do this, the satellite comprises means for draining the pressurizing tanks of the propulsion system, means for isolating the propulsion system from its pressurizing tanks, means for isolating the pressurizing tanks from each other, and means for connecting, when the pressurizing tanks are empty, the fuel tank to the fourth tank and the oxidizer tank to the fifth tank.

In one embodiment, the craft includes a system of pyrovalves 31 to 36 between the propulsion system and the RFCS energy storage system. The pyrovalve system comprises pyrovalves 32, 33, 34, 35 between the pressurizing tanks 4 and 5, for pressurizing the propellants of the propulsion system, and the propulsion system 10, these pyrovalves serving to isolate the pressurizing tanks from the propulsion means and to isolate the pressurizing tanks from each other. It also includes a pyrovalve 31 between the first tank 1 and the fourth tank 4 and a pyrovalve 36 between the second tank 2 and the fifth tank 5, making it possible, when the tanks of the propulsion system are empty, to connect the fuel tank 1 to the fourth tank 4 and the oxidizer tank 2 to the fifth tank 5. Before the fuel tank and the oxidizer tank have been coupled to the respective pressurizing tanks, a non-negligible pressure difference may exist between these tanks. Through this, the craft includes pressure controlling means between the tanks that are to be connected together. These controlling means are used to limit the flow rate after the valves have been opened for connecting the tanks. The pyrovalve system also includes pyrovalves 37 and 38 for draining the pressurizing tanks 4 and 5. The valves described above and shown in the diagram may be single valves or redundant valves in order to ensure the reliability of the hydraulic system and the safety on the ground. Of course, the fluid system of the propulsion means and of the fuel cell system comprises all the elements necessary for implementing such a system that are known to those skilled in the art, such as for example, pyrovalves, pressure regulators, temperature regulators, compressors.

Figure 2:
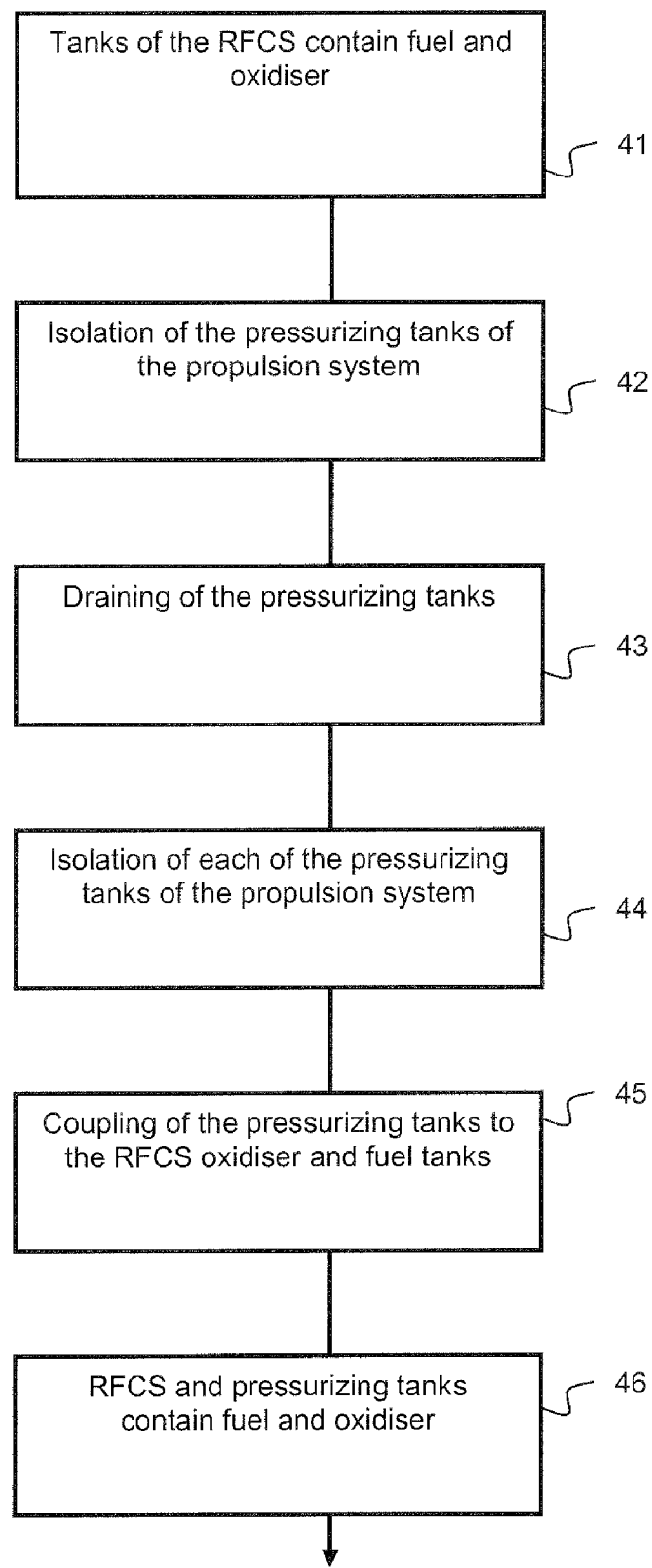
FIG. 2 shows the method of coupling between the energy storage system of the fuel cell and the chemical propulsion system.

The subject of the invention is also, as illustrated in FIG. 2, the method of coupling the tanks of the RFCS energy storage system to the pressurizing tanks of the satellite propulsion system. Advantageously, the method carries out the following successive steps:

in a first step 41, the fuel is contained only in the first tank 1 and the oxidizer is contained only in the second tank 2;

in a second step 42, the propulsion system 10 is isolated from the pressurizing tanks 4 and 5;

in a third step 43, the pressurizing tanks 4 and 5 are drained;

in a fourth step, the pressurizing tanks 4 and 5 are isolated from each other;

in a fifth step, the pressurizing tanks 4 and 5 are connected to the tanks 1 and 2 of the energy storage system; and in a sixth step, the fourth tank 4 contains a portion of the fuel and the fifth tank 5 contains a portion of the oxidizer, the other portions being contained in the first and second tanks 1 and 2.

Figure 3A:
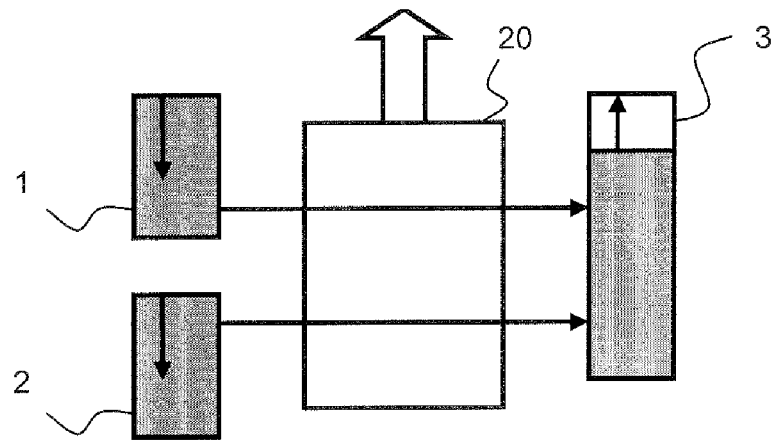
FIG. 3a illustrates the operation of the regenerative fuel cell when it is in discharge mode for generating the energy for the functional systems of the satellite during the first step of the method.
Figure 3B:
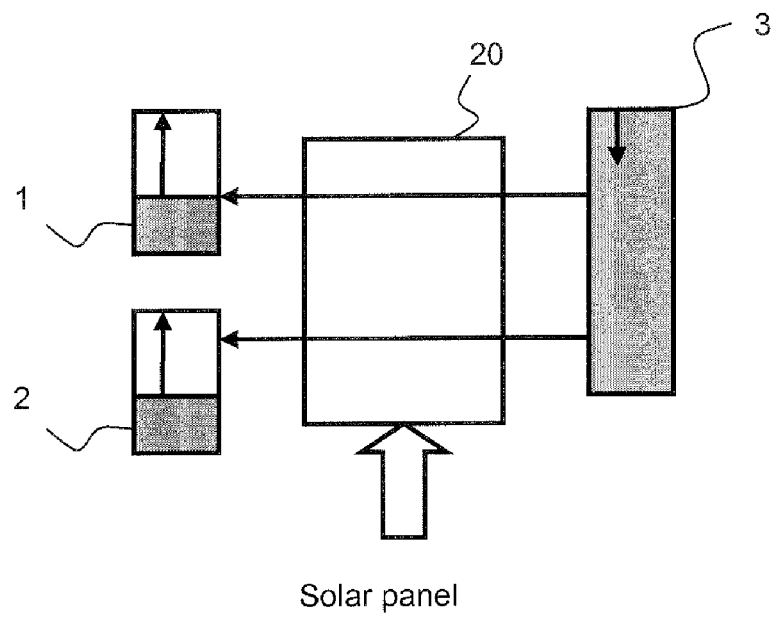
FIG. 3b illustrates the operation of the regenerative fuel cell when it is in recharge mode during the first step of the method.

In the first step 41, the tanks of the energy storage system are in the configuration as illustrated by FIGS. 3a and 3b. The fuel is contained in the first tank 1, the oxidizer in the second tank 2 and the water from the fuel cell system 20 is contained in the tank 3. The tanks containing the oxidizer and the fuel are undersized, for the requirements in orbit. The first tank has a volume V1 at a first pressure, the second tank has a volume V2 at this same pressure, and the third tank has a volume V3. The regenerative fuel cell system may generate a quantity Q1 of oxidizer and a quantity Q2 of fuel by electrolysing a quantity Q3 of the product contained in the volume V3 at a second pressure, the first pressure being considered the optimum (i.e. the maximum) for minimising the volumes V1 and V2. The volume V1 of the oxidizer tank is smaller than the volume necessary for containing the quantity Q1 at the same first pressure, the volume V2 of the fuel tank is smaller than the volume necessary for containing the quantity Q2 at the same first pressure, and the sum of the volumes V1 and V2 of the oxidizer and fuel tanks and of the volume of the pressurizing tanks is at least equal to the volume necessary for containing Q1 and Q2 at a pressure below the first pressure. The electrolyser is capable of generating an oxidizer volume V4 and a fuel volume V5 by electrolysing the quantity Q3 of product.

The first tank 1 and the second tank 2 are sized for a given maximum pressure and for the power requirements during the launch and transfer phases. The electrolysis operating mode is shown by FIG. 3*b*. The invention enables the volume V1 of the oxidizer tank 1 to be smaller than the volume V4 and for the volume V2 of the fuel tank 2 to be smaller than the volume V5 at the same pressure. This is because the tanks 1 and 2 are sized for containing the volume of dihydrogen gas and dioxygen gas that the energy storage system requires for the launch phase and the transfer phase until a satellite is operational. Thus, the reduced dimensions of the fuel and oxidizer tanks make it possible to reduce the size and mass of the satellite.

FIG. 3*a* shows the regenerative fuel cell system in energy generation or discharge mode for the electronic systems of the satellite. The tanks 1 and 2 are filled and the tank 3 contains a quantity of product so that a sufficient volume remains for containing the volume of water resulting from the reaction between the volumes V1 and V2 of reactants. The proportion between the reservoir volumes is schematic and does not represent the actual proportion of reactant and product necessary for the regenerative fuel cell system. In oxidation mode, the dihydrogen and dioxygen gases react in the cell, to form water in the tank 3, in which operating mode the cell can generate energy.

FIG. 3*b* shows the energy storage system in electrolysis or recharge mode. The solar panels of the satellite generate power, which is delivered to the regenerative fuel cell system 20 in order to carry out the electrolysis reaction. The water contained in the tank 3 is converted to dihydrogen and dioxygen, which two reactants are contained in the tanks 1 and 2.

During the launch phase and the transfer phase, the energy storage system of the satellite operates according to the system configuration described above. Once the satellite is positioned into the geostationary orbit by means of successive manoeuvres using the chemical propulsion system, the propellant-pressurizing tanks are no longer used.

During this phase, in the second step 42 the propulsion means 10 are isolated from the pressurizing tanks 4 and 5, and the pyrovalve 33 is closed. In the third step 43, the gas tanks 4 and 5 are drained. The pyrovalves 35 and 37 are open and the draining system 6 expels the fluid from the satellite. The draining is completed by the pyrovalve 38 being closed. In the fourth step 44, the pressurizing tanks 4 and 5 are isolated from each other by closing the pyrovalves 32 and 34. In the fifth step 45, the fuel tank is connected to the previously drained fourth tank of the propulsion means by opening the pyrovalve 31 and the oxidizer tank is connected to the previously drained fifth tank of the propulsion means by opening the pyrovalve 36. Thus, the products resulting from the regenerative fuel cell electrolysis reaction make use of the additional volume of the tanks initially provided for the pressurizing gas. Pressure control means exist between the pyrovalve 36 and the pyrovalve 35, and between the pyrovalve 31 and the pressurizing tank 4.

Figure 4A:
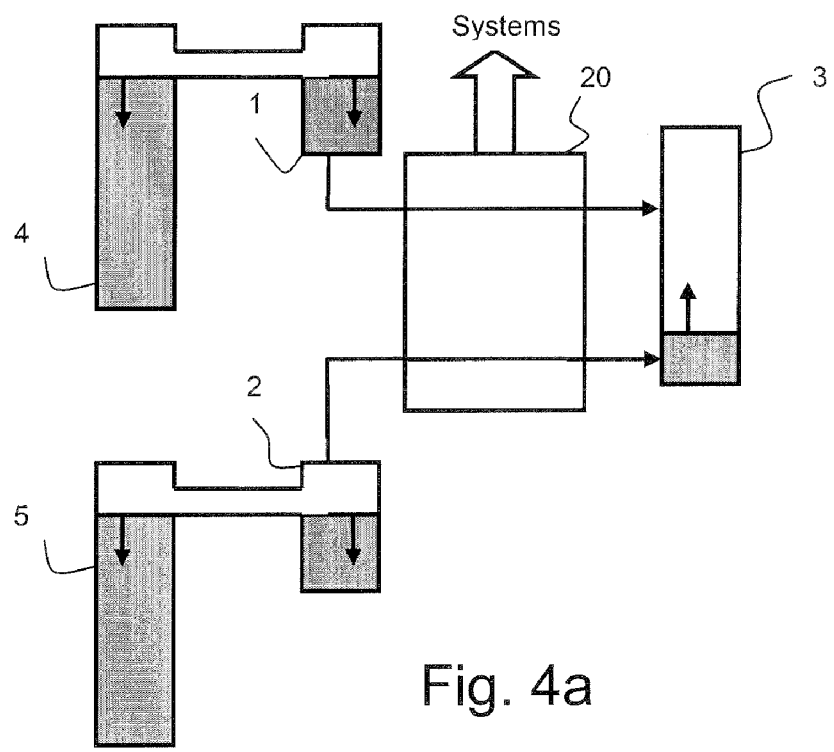
FIG. 4a illustrates the operation of the regenerative fuel cell when it is in discharge mode for generating the energy for the functional systems of the satellite in the final step of the method, the pressurizing tanks of the chemical propulsion system being connected to the tanks of the energy storage system.
Figure 4B:
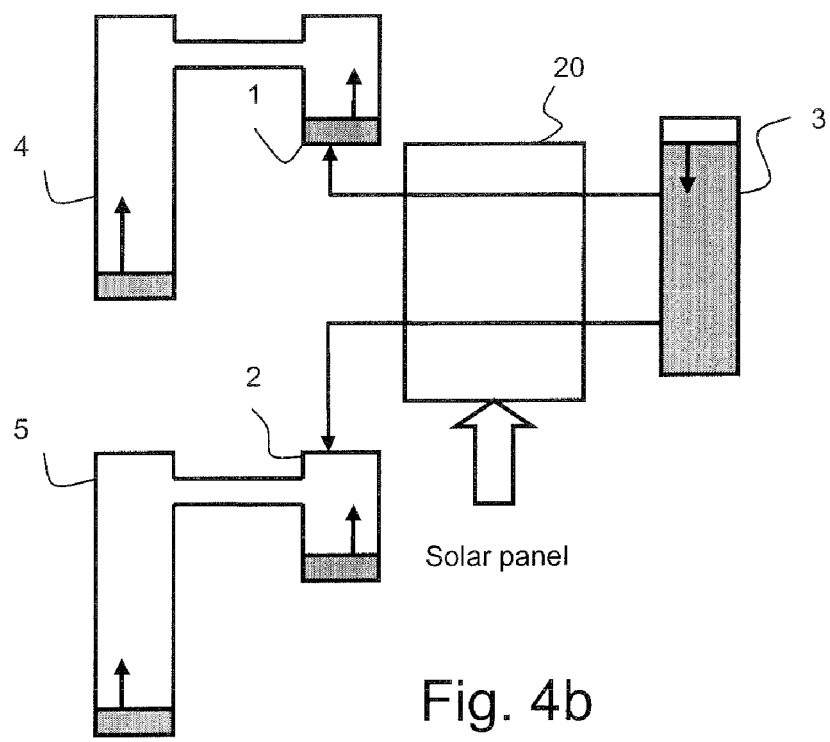
FIG. 4b illustrates the operation of the regenerative fuel cell when it is in recharge mode in the final step of the method, the pressurizing gas tanks of the chemical propulsion system being connected to the tanks of the energy generation system.

FIGS. 4*a* and 4*b* illustrate the configuration of the tanks 1, 2, 4 and 5 constituting the fuel and oxidizer storage means of the fuel cell system once the tanks 4 and 5 initially provided for pressurizing the propulsion means are connected to the tanks 1 and 2 of the regenerative fuel cell system. This configuration is established when the satellite is in a geostationary orbit phase. The volume formed by the sum of the volume V1 of the tank 1 and of the volume V4 of the tank 4 is at least equal to the volume of a fictitious tank that would be necessary for storing the volume of fuel that can be generated after electrolysing all of the water contained in the tank 3 of volume V3, knowing that the pressure is the same in both these tanks. The volume formed by the sum of the volume V2 of the tank 2 and of the volume V5 of the tank 5 is at least equal to the volume of a fictitious tank that would be necessary for storing the volume of oxidizer that can be generated after electrolysing all of the water contained in the tank 3 of volume V3, knowing that the pressure is the same in both these tanks. The fuel, oxidizer and water volumes shown in FIGS. 4*a* and 4*b* are given by way of indication and do not represent actual quantities involved in the reaction of the fuel cell system.

FIG. 4*a* shows the regenerative fuel cell system 20 in energy generation mode when the water tank is practically at its minimum level. The reaction between the fuel and the oxidizer enables the cell to generate electrical energy for the satellite's electronic systems.

FIG. 4*b* shows the regenerative fuel cell system 20 in energy recharge mode when the water tank is practically at its maximum level. In this operating mode, the power needed for the electrolysis is delivered by a solar generator system. The fuel produced by the reaction can be stored, either in the tank 1 when the satellite is in the launch phase and in the transfer phase, or in the tanks 1 and 4 when the satellite is operational. The oxidizer produced by the reaction can be stored, either in the tank 2 when the satellite is in the launch phase and in the transfer phase, or in the tanks 2 and 5 when the satellite is operational. The increase in volume by using the pressurizing tanks of the propulsion means enables the fuel cell system to generate a larger quantity of fuel and oxidizer during the electrolysis phase than is the case with the tanks 1 and 2. Consequently, the energy reserve coming from the fuel cell system is greater for a lower total volume of the tank 1 and the tank 2. The fact of not adding additional tanks, but coupling the tanks 1 and 2 to the tanks 4 and 5, enhances the performance, measured in Wh/kg, of the regenerative fuel cell system.

The invention applies particularly to telecommunication satellites, but is not limited to this type of spacecraft. It is also of benefit for any other craft for which it would be possible to use available tanks after a phase during which the power demand is lower. At the start of its life, the satellite does not require high power since the systems dedicated to its mission are not yet in operation. It is therefore possible to use smaller tanks for the fuel cell energy storage system. When the power demand becomes greater, the satellite is in the geostationary phase and the propellant-pressurizing tanks are available.

What is claimed is:

1. Craft comprising a regenerative fuel cell energy storage system, a chemical propulsion system and a system for pressurizing propellants used for propulsion, comprising:
    a. wherein the energy storage system comprises a first tank containing a fuel, a second tank containing an oxidizer and a third tank containing a product resulting from the reaction between the oxidizer and the fuel;
    b. wherein the propellant pressurizing system comprises at least a fourth pressurizing tank and a fifth pressurizing tank, the fourth and fifth tanks each containing a pressurizing gas;
    c. one or more means for coupling the tanks of the energy storage system to the tanks of the propellant pressurizing system, these means comprising means for:
        i. draining the pressurizing tanks;
        ii. isolating the propulsion system from the pressurizing tanks;
        iii. isolating the pressurizing tanks from each other; and
        iv. connecting, when the pressurizing tanks no longer contain the pressurizing gas, the first tank to the fourth tank and the second tank to the fifth tank.

2. Craft according to claim 1, wherein the energy storage system further comprises the fourth and fifth tanks.

3. Craft according to claim 2, further comprising a system of valves between the propulsion system and the energy storage system comprising:
   a. first valves between the pressurizing tanks and the propulsion system;
   b. second valves between the first tank and the fourth tank;
   c. third valves between the second tank and the fifth tank; and
   d. fourth valves for draining the pressurizing tanks.

4. Craft according to claim 3, wherein the means for draining the pressurizing tanks include, at their outlets, a means for ejecting fluids to the outside of the craft with no propulsion effect.

5. Craft according to claim 4, Wherein the energy storage system is powered by a system for generating power for carrying out electrolysis.

6. Craft according to claim 1, wherein the craft is a Satellite.

7. The craft of claim 1, further comprising where the craft is in use during a propulsion stage, the contents in the first and second tanks are different from the contents of the fourth and fifth tanks.

8. Method for coupling the tanks of an energy storage system of the regenerative fuel cell type to tanks for pressurizing propellants of a chemical propulsion system of a craft, the energy storage system comprising at least three tanks for containing, in a first tank, a fuel, in a second tank, an oxidizer and, in a third tank, a product resulting from the reaction of the oxidizer and the fuel, and a pressurizing system comprising at least fourth and fifth pressurizing tanks containing a pressurizing gas, comprising the following successive steps:
   a. in a first step, the fuel is contained only in the first tank and the oxidizer is contained only in the second tank;
   b. in a second step, the propulsion system is isolated front the pressurizing tanks;
   c. in a third step, the pressurizing tanks are drained;
   d. in a fourth step, the pressurizing tanks are isolated from each other;
   e. in a fifth step, the pressurizing tanks are connected to the first and second tanks, respectively of the energy storage system; and
   f. in a sixth step, the fourth tank contains a portion of the fuel and the fifth tank contains a portion of the oxidizer, the other portions being contained in the first and second tanks of the energy storage system.

9. The method as claimed in claim 8, wherein, in the first step, the dimensions of the tanks containing the oxidizer and the fuel are smaller than the dimensions necessary for the power requirements of the craft in the mission phase at a given pressure.

10. Method according to claim 9, wherein the craft is a spacecraft intended to be positioned in a geostationary orbit, the positioning in orbit being preceded by a craft launch phase followed by a phase during which, the craft is transferred to the geostationary orbit position, wherein the second step is triggered after the craft transfer phase.

* * * * *